United States Patent [19]

Nakagawa et al.

[11] Patent Number: 4,560,735

[45] Date of Patent: Dec. 24, 1985

[54] PROCESS FOR PREPARING COPOLYMER

[75] Inventors: Masao Nakagawa, Kobe; Kiyoshi Mori, Kakogawa; Toshiaki Sugita, Takasago, all of Japan

[73] Assignee: Kanegafuchi Kagaku Kogyo Kabushiki Kaisha, Osaka, Japan

[21] Appl. No.: 714,759

[22] Filed: Mar. 22, 1985

[30] Foreign Application Priority Data

| Mar. 29, 1984 [JP] | Japan | 59-63063 |
| Mar. 29, 1984 [JP] | Japan | 59-63064 |
| Mar. 29, 1984 [JP] | Japan | 59-63065 |

[51] Int. Cl.[4] .................................................. C08F 4/36
[52] U.S. Cl. .................................. 526/232.3; 526/232; 526/342
[58] Field of Search ............................. 526/232.3, 342

[56] References Cited

U.S. PATENT DOCUMENTS

| 3,341,507 | 9/1967 | Guillet | 526/232.3 |
| 3,491,071 | 1/1970 | Lanzo | 526/342 |
| 4,049,605 | 9/1977 | Kobashi | 526/232.3 |
| 4,169,195 | 9/1979 | Rinehart | 526/342 |
| 4,200,593 | 4/1980 | van der Loos | 526/342 |
| 4,340,723 | 7/1982 | Duyzings | 526/342 |

Primary Examiner—Paul R. Michl
Attorney, Agent, or Firm—Armstrong, Nikaido, Marmelstein & Kubovcik

[57] ABSTRACT

A process for preparing α-methylstyrene/acrylonitrile copolymer by suspension or bulk polymerization of α-methylstyrene and acrylonitrile with at least one member selected from the group consisting of styrene, chlorostyrene, para-methylstyrene, t-butylstyrene, acrylic ester and methacrylic ester in the presence of a difunctional organic peroxide having a 10 hour half-life temperature of 60° to 120° C. and capable of producing a t-butyl radical, at a polymerization temperature of 80° to 135° C. The process produces the copolymers having excellent transparency, heat resistance and strength in a high conversion in a short time.

4 Claims, No Drawings

PROCESS FOR PREPARING COPOLYMER

BACKGROUND OF THE INVENTION

The present invention relates to a process for preparing α-methylstyrene/acrylonitrile copolymers, and more particularly to a process for preparing a copolymer having excellent transparency, heat resistance and strength in a high conversion in a short time by copolymerizing α-methylstyrene and acrylonitrile with at least one member selected from the group consisting of styrene, chlorostyrene, para-methylstyrene, t-butylstyrene, acrylic ester and methacrylic ester in the presence of a specific peroxide by suspension or bulk polymerization.

When α-methylstyrene, acrylonitrile and at least one compound capable of copolymerizing with α-methylstyrene and acrylonitrile selected from the group consisting of styrene and a substituted styrene such as chlorostyrene, para-methylstyrene or t-butylstyrene; an acrylic ester such as methyl acrylate, ethyl acrylate or butyl acrylate; and a methacrylic ester such as methyl methacrylate, ethyl methacrylate or butylmethacrylate are copolymerized, it is necessary to employ α-methylstyrene in an amount of at least 10% by weight (hereinafter referred to as "%"), preferably at least 20%, of the whole monomers to be used to produce a copolymer containing at least 10%, preferably at least 20%, of the α-methylstyrene units, in order to obtain a copolymer which has heat resistance sufficient for practical use.

When it is desired to prepare a copolymer containing a large amount of α-methylstyrene by suspension or bulk polymerization to obtain a copolymer having an excellent heat resistance, a process employing as a polymerization initiator an organic peroxide such as t-butyl peroxybenzoate, t-butyl peroxyacetate or di-t-butyl peroxide is adoptable. However, in a process employing such initiators, it is necessary to employ a large amount of the initiators regardless of the polymerization temperature. Consequently, an α-methylstyrene/acrylonitrile copolymer prepared by such a process is very low in the degree of polymerization and is poor in utility as a molding material. On the other hand, in case of using these initiators in a decreased amount for the purpose of raising the degree of polymerization, so-called dead end polymerization occurs. Thus a high conversion as required in industrial production is not obtained or a very long polymerization time is necessary in order to obtain a high conversion, and therefore, a productivity is very low. Also, when an organic peroxide such as benzoyl peroxide is employed by suspension or bulk polymerization, the copolymer is not obtained in an industrially satisfactory high conversion even at an optimum temperature for the peroxide.

Like this, the α-methylstyrene/acrylonitrile copolymers prepared by a conventional suspension or bulk polymerization process cannot provide the copolymers capable of industrially utilizing as molding materials, or even if obtained, the productivity is very low.

It is an object of the present invention to provide a process for preparing a α-methylstyrene/acrylonitrile copolymer having excellent transparency, heat resistance and strength in a high conversion in a short time by a suspension or bulk polymerization technique.

SUMMARY OF THE INVENTION

In accordance with the present invention, there is provided a process for preparing a copolymer which comprises copolymerizing 10 to 80% of α-methylstyrene, 5 to 50% of acrylonitrile and 0 to 70% of at least one member selected from the group consisting of styrene, chlorostyrene, para-methylstyrene, t-butylstyrene, acrylic ester and methacrylic ester in the presence of a difunctional organic peroxide having a 10 hour half-life temperature of 60° to 120° C. and capable of producing t-butoxy radical as an initiator at 80° to 135° C. by suspension or bulk polymerization.

In the present invention, there is provided a copolymer having excellent transparency, heat resistance and strength in a high conversion in a short time.

DETAILED DESCRIPTION

In the present invention, there are employed mixed monomers consisting of 10 to 80% of α-methylstyrene, 5 to 50% of acrylonitrile and 0 to 70% of at least one member from the group consisting of styrene and a substituted styrene such as chlorostyrene, paramethylstyrene or t-butylstyrene; an acrylic ester such as methyl acrylate, ethyl acrylate or butyl acrylate; and a methacrylic ester such as methyl methacrylate, ethyl methacrylate or butyl methacrylate, preferably 20 to 80% of α-methylstyrene, 10 to 40% of acrylonitrile and 0 to 70% of at least one member selected from the group consisting of styrene and a substituted styrene such as chlorostyrene, para-methylstyrene or t-butylstyrene; an acrylic ester such as methyl acrylate, ethyl acrylate or butyl acrylate; and a methacrylic ester such as methyl methacrylate, ethyl methacrylate or butyl methacrylate.

In the present invention, difunctional organic peroxides are employed as polymerization initiators. The term "difunctional peroxides" as employed herein means peroxides having two —O$_2$— groups capable of producing radicals. Difunctional organic peroxides having a 10 hour half-life temperature of 60° to 120° C. and capable of producing t-butoxy radical are employed in the invention. The term "10 hour half-life temperature" as employed herein means the temperature at which 10 hours are required in reducing the concentration of an initiator by half by the thermal decomposition.

Examples of the initiator employed in the present invention are, for instance, difunctional peroxides having the formula (I):

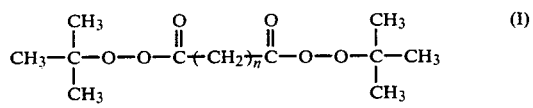

wherein n is an integer of at least one. Examples of the above initiator are, for instance, di-t-butylperoxyazelate, di-t-butylperoxyadipate, di-t-butylperoxysuccinate, di-t-butylperoxysebacate, di-t-butylperoxyglutarate, and the like.

And further, examples of the initiator employed in the invention are, for instance, 2,5-dimethyl-2,5-di-(t-butylperoxy)hexane, di-t-butylperoxyhexahydroterephthalate, 1,1-di-t-butylperoxy-3,3,5-trimethylcyclohexane, 1,1-di-t-butylperoxycyclohexane, di-t-butylperoxyazelate, 2,2-di-(t-butylperoxy)butane, 4,4-di-t-butylperoxyvalerate-n-butyl ester, di-t-butylperoxytrimethyl adipate, and the like; preferably, 2,5-dimethyl-2,5-di-(t-butylperoxy)hexane, di-t-butylperoxyhexahydroterephthalate and 1,1-di-t-butylperoxy-3,3,5-trimethylcyclohexane.

The initiator is employed in an amount of 0.1 to 2.0%, preferably 0.2 to 1.5%. When the amount of the initiator is less than 0.1%, no industrially practical conversion is obtained, or a very long time is required for polymerization, and thus resulting in lowering of productivity. When the amount is more than 2.0%, a copolymer is obtained in a high conversion in a short time, but the molecular weight is low, and accordingly the strength of moldings made therefrom is extremely low.

It cannot be expected from conventional knowledge and technique that the α-methylstyrene/acrylonitrile copolymer having a high quality is obtained in a very short time by a suspension or bulk polymerization employing the difunctional organic peroxide having a 10 hour half-life temperature of 60° to 120° C. and capable of producing a t-butoxy radical. However, the reason is not made clear.

Known suspension and bulk polymerization techniques are applicable to the process of the invention. Particularly, in case of suspension polymerization, known dispersing agents are added to an aqueous medium. The dispersing agents include, for instance, organic dispersing agents such as polyvinyl alcohol, polyvinyl pyrrolidone and methyl cellulose, and inorganic dispersing agents such as calcium phosphate, magnesium phosphate, sodium silicate, zinc oxide and magnesium carbonate. In case of the inorganic dispersing agents, a combined use thereof with anionic surface active agents such as sodium dodecyl benzenesulfonates and sodium α-olefinsulfonate is effective in increasing the dispersing effect.

When the initiator of the present invention is employed, it is important to select the polymerization temperature. The polymerization temperature is preferable from 80° to 135° C., more preferably 90° to 120° C. When the temperature is lower than 80° C., the amount of produced radicals is little and the conversion is low, and when the temperature is higher than 135° C., the molecular weight of the produced polymer is lowered and industrially useful copolymer is hard to obtain.

The present invention is more specifically described and explained by means of the following Examples, in which all % and parts are by weight unless otherwise noted. It is to be understood that the present invention is not limited to the Examples, and various changes and modifications may be made in the invention without departing from the spirit and scope thereof.

In each Tables of Examples, the conversion of the produced copolymer is shown with a percentage (% by weight). Also, the properties of a copolymer were measured with respect to a molding prepared by injection molding from the copolymer. The heat deflection temperature shows the heat resistance of the copolymer and was measured according to Japanese Industrial Standard (JIS) K 6871. The impact strength was measured according to JIS K 6871. And further, the specific viscosity $\eta_{sp}$ was mesured at 30° with respect to a 0.3% solution of a copolymer in dimethylformamide. It is shown as a measure of degree of polymerization.

EXAMPLE 1

An autoclave equipped with a stirrer was charged with 110 parts of water, 0.24 part of calcium phosphate, 0.003 part of sodium dodecylbenzenesulfonate and 0.2 part of sodium chloride. To the autoclave was added mixed monomers of 50 parts of α-methylstyrene in which 0.3 part of di-t-butyl peroxyhexahydroterephthalate was dissolved, 30 parts of acrylonitrile and 20 parts of styrene with stirring and the monomers were suspended in the reaction system. Immediately, the temperature was elevated to 95° C., and the polymerization was carried out for 7 hours at that temperature. After cooling the reaction mixture to 40° C., the dehydration and drying were conducted to give resin (A).

Conversion and specific viscosity of the resin (A) and deflection temperature and impact strength of the molding made of the resin (A) are shown in Table 1.

EXAMPLE 2

The procedure of Example 1 was repeated except that 0.5 part of 1,1-di-t-butylperoxy-3,3,5-trimethylcyclohexane was employed instead of 0.3 part of di-t-butyl peroxyhexahydroterephthalate and the polymerization was carried out at 100° C. instead of 95° C. to give resin (B).

The results are shown in Table 1.

EXAMPLE 3

The procedure of Example 1 was repeated except that 0.5 part of di-t-butyl peroxyhexahydroterephthalate was employed to give resin (C).

The results are shown in Table 1.

COMPARATIVE EXAMPLE 1

The procedure of Example 1 was repeated except that 0.3 part of benzoyl peroxide was employed instead of 0.3 part of di-t-butyl peroxyhexahydroterephthalate to give resin (D).

The results are shown in Table 1.

TABLE 1

| | Initiator | | Conversion (%) | Specific viscosity | Deflection temp. (°C.) | Impact strength (kg cm/cm) |
|---|---|---|---|---|---|---|
| | Kind | Amount (part) | | | | |
| Ex. 1 | Di-t-butyl peroxyhexahydroterephthalate | 0.3 | 99.3 | 0.25 | 114 | 1.9 |
| Ex. 2 | 1,1-Di-t-butylperoxy-3,3,5-trimethylcyclohexane | 0.5 | 99.0 | 0.20 | 115 | 1.9 |
| Ex. 3 | Di-t-butyl peroxyhexahydroterephthalate | 0.5 | 99.6 | 0.22 | 114 | 1.9 |
| Com. Ex. 1 | Benzyol peroxide | 0.3 | 71.5 | * | * | * |

*In Comparative Example 1, specific viscosity, deflection temperature and impact strength were not measured, because the practicality of resin was low due to low conversion of resin.

EXAMPLE 4

The procedure of Example 1 was repeated except that di-t-butyl peroxyhexahydroterephthalate was employed in an amount of 1.0 part and 30 parts of α-methylstyrene, 10 parts of acrylonitrile and 60 pats of styrene were copolymerized. The conversion was 98.2%. The copolymer was obtained in a high conversion in a short time. The deflection temperature was 118° C.

COMPARATIVE EXAMPLE 2

The procedure of Example 4 was repeated except that 1.0 part of benzoyl peroxide was employed instead of 1.0 part of di-t-butyl peroxyhexahydroterephthalate was employed and the polymerization was carried out at 90° C. The conversion was very low as 42%.

EXAMPLE 5

An autoclave equipped with a stirrer was charged with 110 parts of water, 0.24 part of calcium phosphate, 0.003 part of sodium dodecylbenzenesulfonate and 0.2 part of sodium chloride. To the autoclave was added mixed monomers of 50 parts of α-methylstyrene in which 0.5 part of di-t-butyl peroxyazelate was dissolved, 30 parts of acrylonitrile and 20 parts of styrene with stirring and the monomers were suspended in the reaction system. Immediately, the temperature was elevated to 105° C., and the polymerization was carried out for 7 hours at that temperature. After cooling the reaction mixture to 40° C., the dehydration and drying were conducted to give resin (E).

Conversion and specific viscosity of the resin (E) and deflection temperature and impact strength of the molding made of the resin (E) are shown in Table 2.

COMPARATIVE EXAMPLE 3

The procedure of Example 5 was repeated except that 0.5 part of benzoyl peroxide was employed instead of 0.5 part of di-t-butyl peroxyazelate and the polymerization was carried out at 90° C. to give resin (F).

The results are shown in Table 2.

EXAMPLE 6

The procedure of Example 5 was repeated except that di-t-butyl peroxyazelate was employed in an amount of 0.3 part and the polymerization was carried out for 10 hours to give resin (G).

The results are shown in Table 2.

EXAMPLE 7

The procedure of Example 5 was repeated except that mixed monomers of 30 parts of α-methylstyrene, 10 parts of acrylonitrile and 60 parts of styrene were copolymerized to give resin (H).

The results are shown in Table 2.

TABLE 2

| | Initiator | | Conversion (%) | Specific viscosity | Deflection temp. (°C.) | Impact strength (kg cm/cm) |
| --- | --- | --- | --- | --- | --- | --- |
| | Kind | Amount (part) | | | | |
| Ex. 5 | Di-t-butyl peroxyazelate | 0.5 | 99.1 | 0.183 | 114 | 1.9 |
| Ex. 6 | Di-t-butyl peroxyazelate | 0.3 | 98.9 | 0.215 | 115 | 1.9 |
| Ex. 7 | Di-t-butyl peroxyazelate | 0.5 | 98.2 | 0.188 | — | — |
| Com. Ex. 2 | Benzoyl peroxide | 1.0 | 42 | * | * | * |
| Com. Ex. 3 | Benzoyl peroxide | 0.5 | 78 | * | * | * |

*In Comparative Examples 2 and 3, specific viscosity, deflection temperature and impact strength were not measured, because the practicality of resin was low due to low conversion of resin.

In Examples 5 to 7, di-t-butyl peroxyazelate was employed as an initiator. The obtained copolymers have an excellent heat-resistance being high as 98.2 to 99.1%.

EXAMPLE 8

An autoclave equipped with a stirrer was charged with 110 parts of water, 0.24 part of calcium phosphate, 0.003 part of sodium dodecylbenzenesulfonate and 0.2 part of sodium chloride. To the autoclave were added mixed monomers of 50 parts of α-methylstyrene in which 0.5 part of 2,5-dimethyl-2,5-di(t-butylperoxy)hexane was dissolved, 30 parts of acrylonitrile and 20 parts of styrene with stirring and the monomers were suspended in the reaction system. Immediately, the temperature was elevated to 125° C., and the polymerization was carried out for 7 hours at that temperature. After cooling the reaction mixture to 40° C., the dehydration and drying were conducted to give resin (I).

Conversion and specific viscosity of the resin (I) and deflection temperature and impact strength of the molding made of the resin (I) are shown in Table 3.

EXAMPLE 9

The procedure of Example 8 was repeated except that 2,5-dimethyl-2,5-di(t-butylperoxy)hexane was employed in an amount of 0.3 part and the polymerization was carried out for 10 hours to give resin (J).

The results are shown in Table 3.

EXAMPLE 10

The procedure of Example 8 was repeated except that mixed monomers of 30 parts of α-methylstyrene, 10 parts of acrylonitrile and 60 parts of styrene were copolymerized to give resin (K).

The results are shown in Table 3.

TABLE 3

| | Initiator | | Conversion (%) | Specific viscosity | Deflection temp. (°C.) | Impact strength (kg cm/cm) |
| --- | --- | --- | --- | --- | --- | --- |
| | Kind | Amount (part) | | | | |
| Ex. 8 | 2,5-dimethyl-2,5-di(t-butylperoxy)hexane | 0.5 | 99.3 | 0.180 | 115 | 1.9 |
| Ex. 9 | 2,5-dimethyl-2,5-di(t-butylperoxy)hexane | 0.3 | 99.2 | 0.208 | 114 | 1.9 |
| Ex. 10 | 2,5-dimethyl-2,5-di(t-butylperoxy)hexane | 0.5 | 98.5 | 0.185 | — | — |

In Examples 8 to 10, 2,5-dimethyl-2,5-di(t-butylperoxy)hexane was employed as an initiator. The obtained copolymers have an excellent heat-resistance being high as 98.5 to 99.3%.

In addition to the ingredients employed in the Examples, other ingredients can be employed in the Examples as set forth in the specification to obtain substantially the same results.

What we claim is:

1. A process for preparing a copolymer which comprises copolymerizing by bulk or suspension polymerization 10 to 80% by weight of α-methylstyrene, 5 to 50% by weight of acrylonitrile and 0 to 70% by weight of at least one member selected from the group consisting of styrene, chlorostyrene, paramethylstyrene, t-butylstyrene, acrylic ester and methacrylic esters in the presence of a difunctional organic peroxide having two —O$_2$— groups capable of producing radicals and a 10 hour half-life temperature of 60° to 120° C. and being capable of producing a t-butoxy radical as an initiator at a temperature of 80° to 135° C.

2. The process of claim 1, wherein said difunctional organic peroxide is di-t-butylperoxyhexahydroterephthalate or di-t-butylperoxy-3,3,5-trimethylcyclohexane.

3. The process of claim 1, wherein said difunctional organic peroxide is an inorganic peroxide having the formula (I):

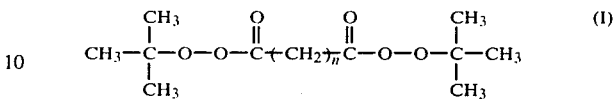

wherein n is an integer of at least one.

4. The process of claim 1, wherein said difunctional organic peroxide is 2,5-dimethyl-2,5-di(t-butylperoxy)-hexane.

* * * * *